US012606127B2

(12) United States Patent
Jackl et al.

(10) Patent No.: US 12,606,127 B2
(45) Date of Patent: Apr. 21, 2026

(54) LENS CLEANING SYSTEM

(71) Applicant: ZKW Group GmbH, Wieselburg (AT)

(72) Inventors: Christian Jackl, Wieselburg (AT); Georg Pitterle, Kirnberg an der Mank (AT)

(73) Assignee: ZKW Group GmbH, Wieselburg (AT)

( * ) Notice: Subject to any disclaimer, the term of this patent is extended or adjusted under 35 U.S.C. 154(b) by 105 days.

(21) Appl. No.: 18/702,552

(22) PCT Filed: Sep. 22, 2022

(86) PCT No.: PCT/EP2022/076329

§ 371 (c)(1),
(2) Date: Apr. 18, 2024

(87) PCT Pub. No.: WO2023/066586

PCT Pub. Date: Apr. 27, 2023

(65) Prior Publication Data

US 2025/0115214 A1      Apr. 10, 2025

(30) Foreign Application Priority Data

Oct. 22, 2021      (EP) .................................... 21204243

(51) Int. Cl.
*B60S 1/54*          (2006.01)
*B60S 1/56*          (2006.01)
*F21S 45/20*        (2018.01)
(52) U.S. Cl.
CPC . *B60S 1/54* (2013.01); *B60S 1/56* (2013.01); *F21S 45/20* (2018.01)
(58) Field of Classification Search
CPC ................................................ B60S 1/54–548
See application file for complete search history.

(56) References Cited

U.S. PATENT DOCUMENTS

2014/0104426 A1*      4/2014      Boegel .................... B60R 11/04
                                                                              348/148
2017/0297536 A1*      10/2017      Giraud ............... G02B 27/0006
(Continued)

FOREIGN PATENT DOCUMENTS

CN          207778313 U          8/2018
JP          H02293236 A          12/1990
JP          2018100011 A      *  6/2018

OTHER PUBLICATIONS

Extended European Search Report for European Patent Application No. 21204243.6 dated Mar. 22, 2022 (5 Pages).
(Continued)

*Primary Examiner* — Omair Chaudhri
(74) *Attorney, Agent, or Firm* — Eversheds Sutherland (US) LLP

(57)          ABSTRACT

The invention relates to a cover lens cleaning system comprising a cover lens (101) for closing an opening of a housing (102) as well as a cleaning device (103), wherein the cover lens (101) is transparent, wherein the cleaning device (103) can apply an air flow for cleaning to an outer surface of the cover lens (101) via an air outlet (108). The cleaning device has one or more drainage openings (109) leading into an outer space on a lower side (103*a*), via which any moisture or liquid such as water present in the cleaning device (103) can escape. A membrane element (106) is arranged above the at least one drainage opening (109) and is reversibly deformable and designed in such a way that in a first so-called ON state, in which the cleaning device (103) is pressurized with air, the membrane element (106) is deformed in such a way that the one or more drainage openings (109) are closed, and in a second so-called OFF state, in which the cleaning device (103) is not pressurized with air, the at least one membrane element (106) is
(Continued)

Figure 1:
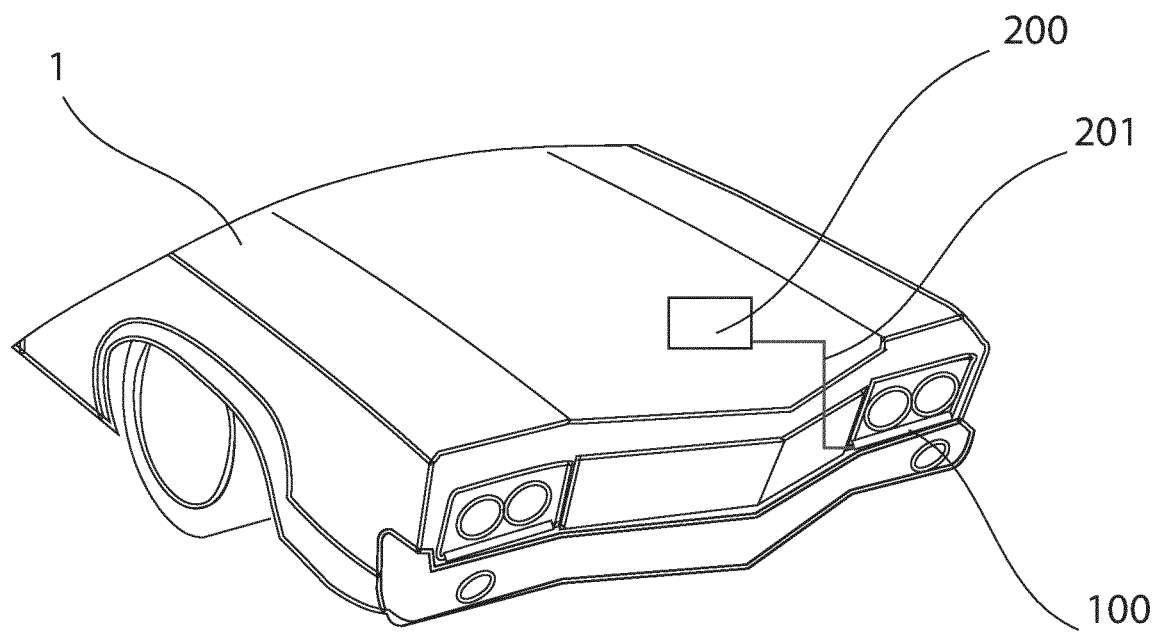

300 deformed in such a way that the one or more drainage openings (109) are at least partially not closed.

20 Claims, 3 Drawing Sheets

(56)                    References Cited

U.S. PATENT DOCUMENTS

| 2021/0086727 | A1  | 3/2021 | Bopp et al. | |
|---|---|---|---|---|
| 2021/0261097 | A1* | 8/2021 | Grether ................. | B05B 1/3006 |
| 2022/0063567 | A1* | 3/2022 | Kubota ..................... | B08B 5/02 |
| 2022/0135005 | A1* | 5/2022 | Yautz ........................ | B60S 1/54 |
| | | | | 134/37 |
| 2023/0271566 | A1* | 8/2023 | Saito ..................... | G01S 13/931 |
| | | | | 248/208 |

OTHER PUBLICATIONS

Search Report for International Patent Application No. PCT/EP2022/076329 dated Dec. 7, 2022 (14 Pages).

\* cited by examiner

300

LENS CLEANING SYSTEM

The invention relates to a cover lens cleaning system comprising a cover lens for closing an opening of a housing and a cleaning device, wherein the cover lens is transparent.

The invention further relates to a housing device for installation in a motor vehicle, wherein the housing device comprises a housing, which is designed to receive one or more light modules and/or one or more sensor devices and/or to attach one or more light modules and/or one or more sensor devices to the housing, wherein the housing has an opening, and wherein the housing device comprises such a cover lens cleaning system, wherein the opening of the housing is closed with the cover lens of the cover lens cleaning system.

When using light modules for producing light distributions in vehicle headlights or vehicle lights, such as vehicle tail lights, but in particular also when integrating optical sensors in such vehicle headlights or vehicle lights, or when using optical sensors that are housed in a corresponding sensor housing, the requirements for a clear view for the light modules and in particular the optical sensors are high, as a reliable function cannot otherwise be guaranteed. Accordingly, cover lenses, e.g. clear cover lenses or diffusing lenses, must be cleaned reliably.

The term "transparent" refers to the wavelength range or ranges in which the devices arranged in the housing or in the housing device behind the cover lens, e.g. light modules, sensors, etc., emit and/or receive electromagnetic radiation, i.e. the cover lens is transparent for these wavelengths or wavelength ranges. The cover lens can also have different levels of transparency in different areas, depending on the devices arranged behind it.

Reliable cleaning is particularly important in particular for "optically" transparent cover lenses, i.e. cover lenses that are transparent in the wavelength range of visible light.

Examples of currently available cleaning systems include wipers, washer nozzles, high-pressure washer nozzles or an air pressure cleaning system for the cover lens of a vehicle headlight or vehicle light.

Cleaning by means of mechanically moving parts is structurally complex and can be expensive. The use of wipers can be problematic in terms of pedestrian safety, high-pressure cleaning systems often suffer from high water consumption and the cleaning quality is often only average.

It is an object of the invention to propose a solution for cleaning a cover lens of a housing device, which is suitable for installation in a motor vehicle, wherein the housing device is, for example, (a substantial) part of a vehicle headlight, a vehicle light or a sensor housing, wherein this solution is based on non-mechanical approaches, and at the same time provides efficient and targeted cleaning. The optical path should not be interrupted and the design options in terms of the vehicle headlight or vehicle light or sensor housing should be restricted as little as possible.

This object is achieved with a cover lens cleaning system mentioned in the introduction by virtue of the fact that according to the invention, the cleaning device has an air connection, via which air can be supplied to the cleaning device, as well as an air outlet, and wherein an air duct is formed in the cleaning device, which opens into the air outlet, wherein the air supplied to the cleaning device flows via the air duct to the air outlet, from which it emerges in the form of an air flow, which, in order to clean the cover lens, acts on the outer surface of the cover lens, wherein the air outlet is arranged in a lower region of the cover lens when the cover lens is in the installed position such that the air flow is directed from below onto the outer surface of the cover lens, and wherein one or more drainage openings leading into an outer space are provided on a lower side, via which any moisture or liquid such as water present in the cleaning device, for example in the air duct, can escape, wherein—in the installed position—at least one membrane element is arranged above the one or more drainage openings and is reversibly deformable and designed in such a way that in a first so-called ON state, in which the cleaning device is pressurized with air, the at least one membrane element is deformed in such a way that the one or more drainage openings are closed, and in a second so-called OFF state, in which the cleaning device is not pressurized with air, the at least one membrane element is deformed in such a way that the one or more drainage openings are at least partially not closed.

In the ON state, the membrane element is deformed by the air flowing in from a compressor, for example, in such a way that the one or more drainage openings are closed. This allows an air flow to build up in the cleaning device, which is directed towards the cover lens such that it is cleaned with this air flow. After the compressor, for example, has been switched off, the membrane element is no longer exposed to incoming air and deforms back into its original state such that the one or more drainage openings are open again.

Due to the, in particular space-constrained, installation of the cleaning device in such a way that the air outlet is located below the cover lens (such that the air flows out upwards), water can, however, enter the cleaning device from above. Water can enter the cleaning device in a variety of ways, for example through rain, moisture that has condensed on the cover lens, melting snow or ice on the lens, water from a car wash, or through water that comes from an additional water nozzle provided additionally for cleaning the cover lens, with which the cover lens can be cleaned by means of water, in particular by means of a water jet.

Water that may gather in the cleaning device can accordingly flow out of the cleaning device via the at least one drainage opening. The cleaning device can thus be drained in a targeted manner by the membrane element opening the at least one drainage opening again after the air supply has been switched off, i.e. in the OFF state.

This is vitally important as water that gets into the cleaning device can cause damage to the cleaning device or surrounding systems (e.g. to a compressor that provides compressed air for the cleaning device, etc.). For example, the cleaning device or air supply line may freeze etc. Liquid may also accumulate in the cleaning device and be blown onto the cover lens during the next cleaning operation, which can cause dirt on the cover lens.

The cleaning device, in particular its air outlet, is placed outside the housing device such that the outside of the cover lens can be exposed to the air flow for cleaning.

The cleaning device is preferably formed from a body, on the lower side of which, preferably—in the installed position—in a lowest region, an outlet is arranged, in which outlet the one or more drainage openings are arranged. The drainage is therefore preferably located at the lowest point of the cleaning device such that any water that has seeped in can drain collectively.

The outlet is designed in the form of an outlet tube, which protrudes from the lower side of the body, wherein the outlet tube opens into the body of the cleaning device, into the air duct, and wherein the outlet tube is designed open towards the outer space.

The outlet tube can have any cross-section, for example circular, but in particular also rectangular or square.

It can be provided that a support element, for example a support plate, which extends over a complete cross-section of the outlet tube, is arranged in the outlet tube, preferably below the body, wherein the one or more drainage openings are preferably arranged in the support element.

The at least one membrane element is preferably arranged in the outlet tube and rests on an upper side of the support element, at least partly or completely, depending on the OFF or ON state, on the support element.

A plurality of drainage openings are preferably provided, which are arranged in the support plate, for example in the form of a grid.

It can be provided that the air outlet is slot-shaped. This makes it possible to generate a strong air flow and/or one that is directed as well as possible onto the cover lens.

The air outlet preferably extends over an entire width of the cover lens.

The membrane element is preferably designed to be flat, and in an OFF state, i.e. without the application of air, in particular compressed air, is bent, in particular bent up at the edge, i.e. bent upwards such that water can drain downwards through the one or more drainage openings.

It can further be provided that the membrane element is designed to be flat, and in an ON state, i.e. with the application of air, in particular compressed air, is substantially flat such that it can rest flat on a support element, in particular a support plate, for example.

The membrane element can therefore be flat in the ON state.

For example, a membrane element that is square or rectangular (in the ON state) is bent up at the edge, specifically on two opposite sides, in the OFF state. In the ON state, the air pressure pushes the membrane element (which is bent in the OFF state) downwards such that the membrane element closes the one or more drainage openings, and a corresponding air flow can build up to clean the cover lens.

The membrane element preferably has an extension (length and width, or radius) such that in the ON state, all drainage openings are completely covered.

By way of example, the at least one membrane element is made of an elastic material, such as an elastic plastic, for example a silicone.

As already mentioned in the introduction, the object according to the invention is also achieved with a housing device.

The cleaning device is preferably arranged on the housing, for example attached to it, or formed integrally with the housing.

It can be provided that one or more light modules and/or one or more sensor devices are arranged in the housing, and/or are attached to the housing.

By way of example, the housing device thus forms a motor vehicle headlight, which has one or more light modules for producing light distributions (for example, dipped beam, full beam, daytime running light, etc.), or a vehicle light (e.g. rear light), wherein the motor vehicle headlight or the vehicle light can also include one or more sensors, in particular "optical" sensors, i.e. sensors that operate with wavelengths in the visible range. However, the housing device can also be a "pure" sensor arrangement, in which only one or more sensors, for example optical sensors, are arranged in the housing.

Figure 4:
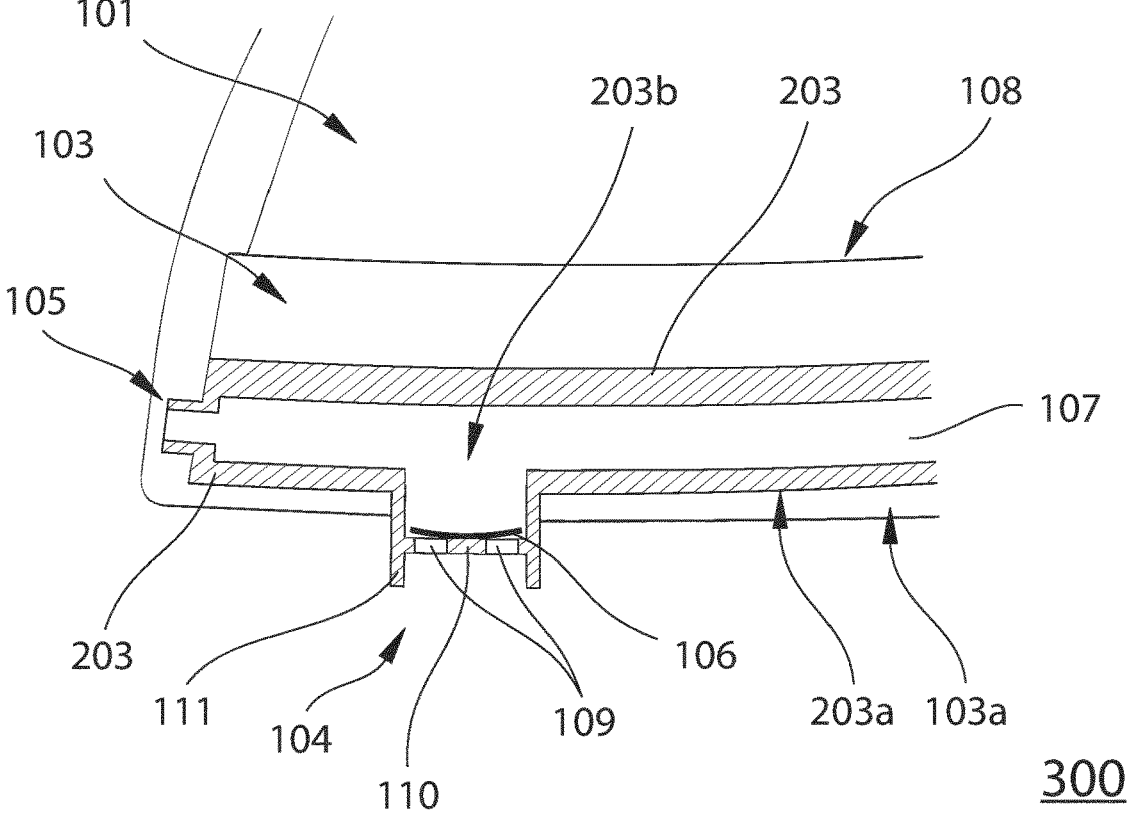
Figures 5, 6:
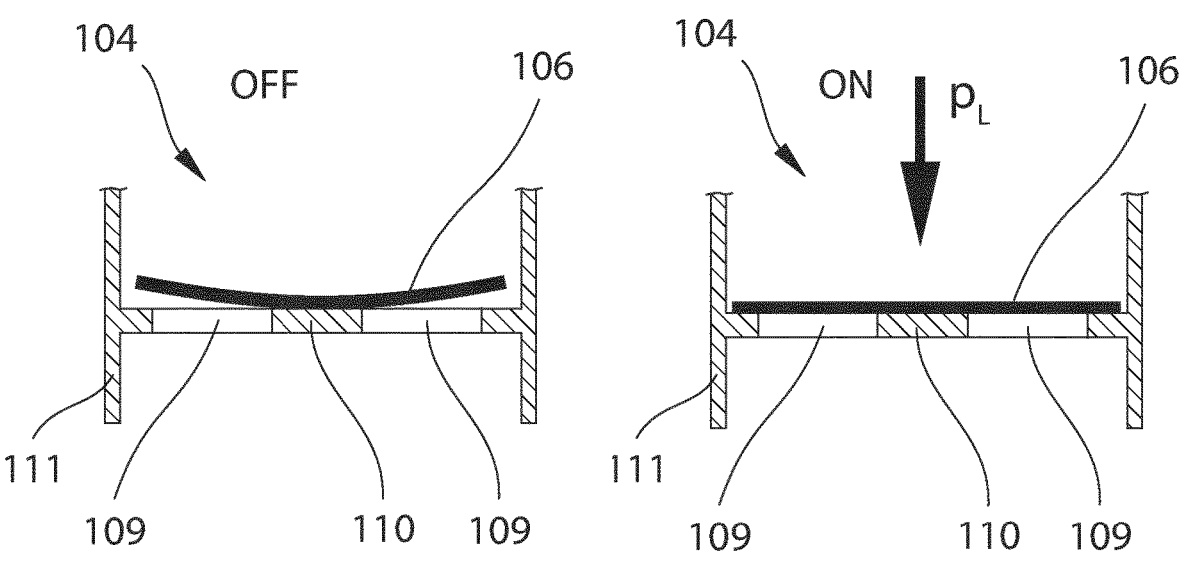
Figures 7, 8:
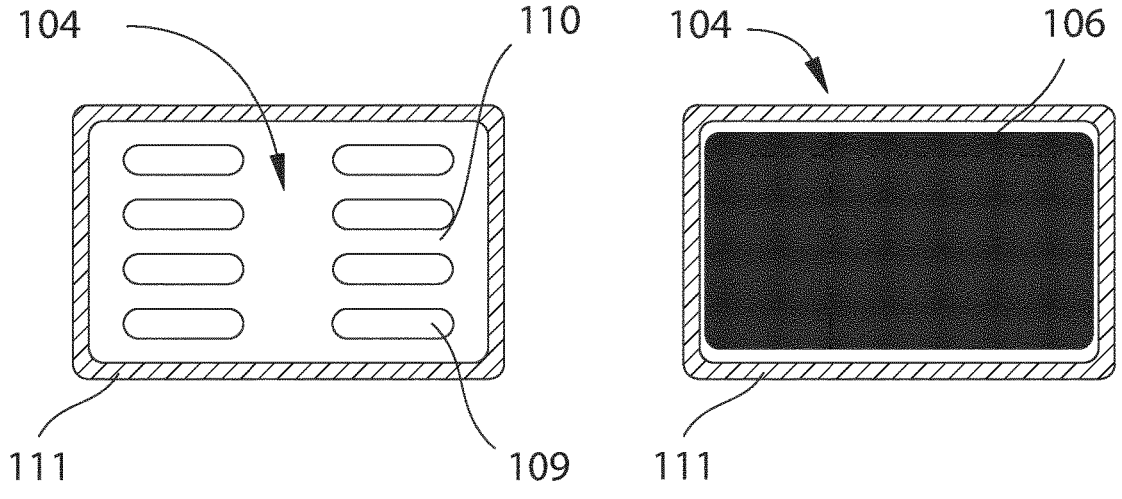

The invention is explained in more detail below based on the non-limiting drawings. In these FIG. 1 shows a motor vehicle with a housing device according to the invention, FIG. 2 shows a housing device in the form of an illumination device, for example a vehicle headlight, with a cleaning device, in a perspective view, FIG. 3 shows a housing device in the form of an illumination device, for example a vehicle headlight, with a cleaning device, in a view from the front, FIG. 4 shows a detail view of part of the cleaning device, FIG. 5 shows the cleaning device in the region of the outlet, in the OFF state, in a vertical section, FIG. 6 shows the cleaning device in the region of the outlet, in the ON state, in the vertical section shown in FIG. 5, FIG. 7 shows a sectional view with a top view of the outlet in the region of a support plate with drainage openings without a membrane element, and FIG. 8 shows the view shown in FIG. 7, with a membrane element in the ON state.

FIG. 1 shows by way of example a motor vehicle 1 with a housing device 100, which is installed in the motor vehicle 1 on its front. In the example shown, it is assumed that the housing device 100 is a motor vehicle headlight. However, all of the following statements apply regardless of whether the housing device 100 is a motor vehicle headlight or another possible embodiment within the scope of the invention as described in the introduction and regardless of whether it is arranged on the vehicle front, rear, or in other regions, and also regardless of which elements (light modules and/or sensors) are arranged in or on the housing device (behind the cover lens).

Figure 2:
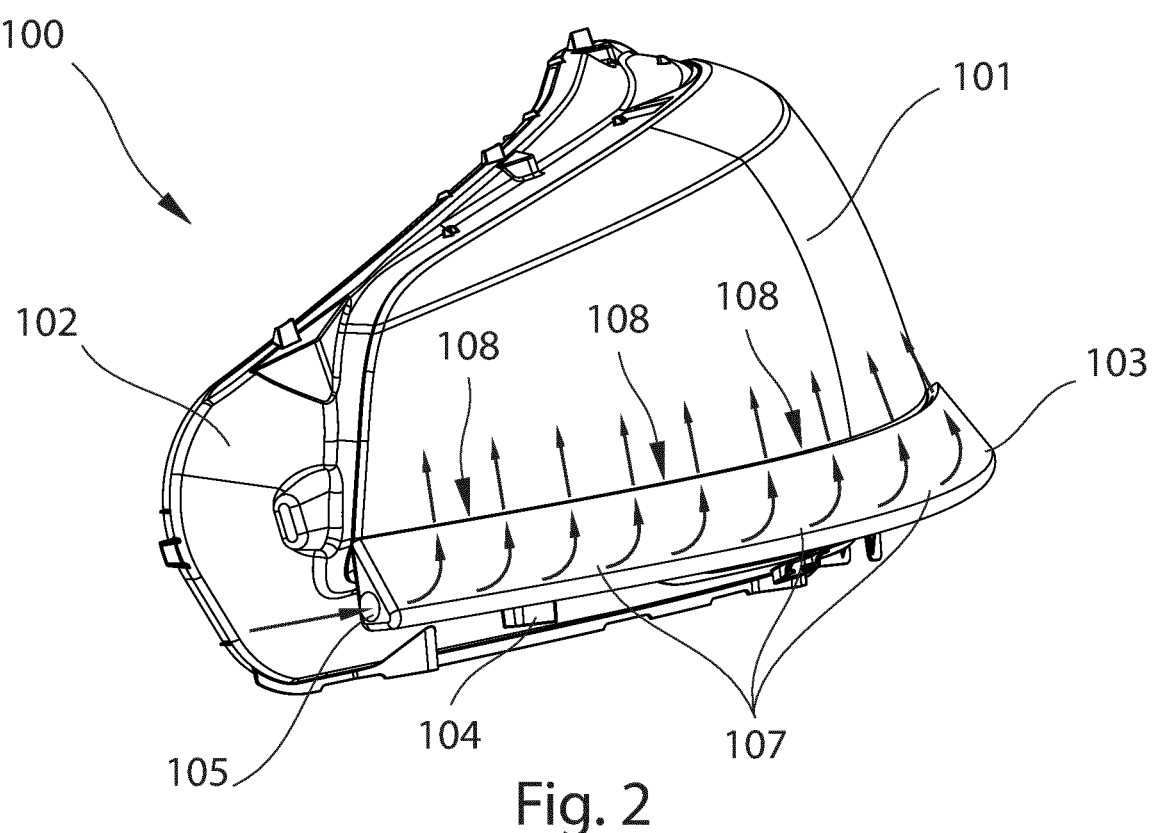
Figure 3:
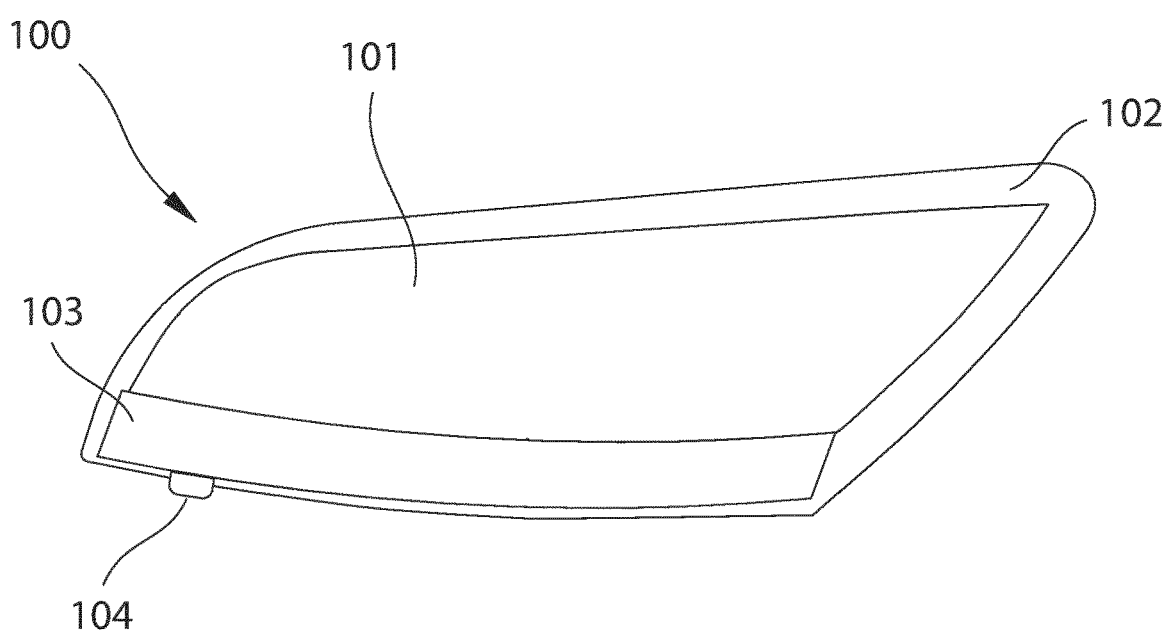

FIG. 2 shows the housing device 100 in a perspective view, FIG. 3 in a view from the front. The device 100 comprises a housing 102, which is designed to receive one or more light modules and/or one or more sensor devices. The housing 102 has an opening on its front, which is closed by a transparent cover lens 101, behind which the element or elements described (light module(s) and/or sensor devices(s)) are located.

The cover lens 101 forms together with a cleaning device 103 a so-called cover lens cleaning system.

The cleaning device 103 has an air connection 105, via which air can be supplied to the cleaning device 103, as well as an air outlet 108, wherein an air duct 107 is formed in the cleaning device 103, which opens into the air outlet 108. The air supplied to the cleaning device 103 flows via the air duct 107 to the air outlet 108, in order to emerge therefrom in the form of an air flow. This air flow is applied to the outer surface of the cover lens 101.

The air supplied via the air connection 105 is produced, for example, by a compressor 200 present on the vehicle side and supplied to the cleaning device 103 via a line 201 (FIG. 1), which opens into the air connection 105.

The air outlet 108 is arranged in a lower region of the cover lens 101 when the cover lens 100 or the housing device 100 is in the installed position such that the air flow is directed from below onto the outer surface of the cover lens 101.

The cleaning device 103 is formed, for example, from a body 203, which is, for example, hollow on the inside (cavity) or has a flow chamber through which the air duct 107 is formed, which opens into the air outlet 108.

One or more drainage openings 109 leading into an outer space are provided on a lower side 103a of the cleaning device 103 or body 203 (lower side 203a), via which any moisture or liquid such as water present in the cleaning device 103 or in the body 203, for example in the air duct 107, can escape.

Furthermore—in the installation position—at least one membrane element 106 is arranged above the one or more drainage openings 109 (FIGS. 4-6) and is reversibly deformable and designed in such a way that in a first so-called ON state, in which the cleaning device 103 is pressurized with air, the at least one membrane element 106 is deformed in such a way that the one or more drainage openings 109 are closed (FIG. 6), and in a second so-called OFF state, in which the cleaning device 103 is not pressurized with air, the at least one membrane element 106 is deformed in such a way that the one or more drainage openings 109 are at least partially not closed (FIG. 5). All drainage openings are preferably completely open in the OFF state.

Specifically, as shown, it can be provided that on the lower side 203*a* of the body 203, which forms the cleaning device 103, in a lower, preferably in a or the lowest region, an outlet 104 is arranged, in which outlet 104 the one or more drainage openings 109 are arranged. The drainage is therefore preferably located at the lowest point of the cleaning device 103 or body 203 such that any water that has seeped in can drain collectively.

In the ON state, the membrane element is deformed by the air flowing in from the compressor 200, for example, in such a way that the one or more drainage openings are closed. This allows an air flow to build up in the cleaning device, which is directed towards the cover lens such that it is cleaned with this air flow. After the compressor has been switched off, the membrane element is no longer exposed to incoming air and deforms back into its original state such that the one or more drainage openings are open again.

Due to the, in particular space-constrained, installation of the cleaning device in such a way that the air outlet is located below the cover lens (such that the air flows out upwards), water can, however, enter the cleaning device from above. Water can enter the cleaning device in a variety of ways, for example through rain, moisture that has condensed on the cover lens, melting snow or ice on the lens, or through water that comes from an additional water nozzle provided additionally for cleaning the cover lens, with which the cover lens can be cleaned by means of water, in particular by means of a water jet.

Water that gathers in the cleaning device can accordingly flow out of the cleaning device via the at least one drainage opening 109. The cleaning device can thus be drained in a targeted manner by the membrane element opening the at least one drainage opening again after the air supply has been switched off, i.e. in the OFF state.

The outlet 104 can be designed in the form of an outlet tube 111, which protrudes from the lower side of the body 203, wherein the outlet tube 111 opens into the body 203 of the cleaning device 103 via an opening 203*b*, i.e. into the air duct 107, and wherein the outlet tube 111 is designed open towards the outer space 300.

The outlet tube can have any cross-section, for example circular, but in particular also rectangular or square.

A support element, for example a support plate 110, which extends over a complete cross-section of the outlet tube 111, is arranged in the outlet tube 111, preferably below the body 203, wherein the one or in the example shown more drainage openings 109 are arranged in the support element.

The membrane element 106 is arranged in the outlet tube 111 and rests on an upper side of the support element 110, at least partly or completely, depending on the OFF or ON state, thereon.

The drainage openings 109 are arranged in the form of a grid in the example shown (see FIG. 7).

The air outlet 108 is preferably slot-shaped, making it possible to generate a strong air flow and/or one that is directed as well as possible onto the cover lens.

The air outlet 108 preferably extends over an entire width of the cover lens 101.

The air outlet is preferably arranged below the lowest region of the cover lens, preferably as close as possible to this cover lens, with approximately no gap.

The membrane element 106 is preferably designed to be flat, and in an OFF state, i.e. without the application of air, in particular compressed air, is bent, in particular bent up at the edge, i.e. bent upwards such that water can drain downwards through the one or more drainage openings (FIG. 5).

In an ON state (FIG. 6, FIG. 8), i.e. with the application of air, in particular compressed air, the membrane element 106 is substantially flat such that it rests flat on a support element, in particular a support plate 110, for example. The membrane element is therefore flat in the ON state.

For example, a membrane element that is square or rectangular (in the ON state) is bent up at the edge, specifically on two opposite sides, in the OFF state (FIG. 5). In the ON state, the air pressure $p_L$ pushes the membrane element (which is bent in the OFF state) downwards (FIG. 6) such that the membrane element closes the one or more drainage openings 109, and a corresponding air flow can build up to clean the cover lens.

The membrane element preferably has an extension (length and width, or radius) such that in the ON state, all drainage openings are completely covered.

The cleaning device 103 is preferably arranged on the housing 102.

It can be provided that one or more light modules and/or one or more sensor devices are arranged in the housing 102, and/or are attached to the housing 102.

By way of example, the housing device thus forms a motor vehicle headlight, which has one or more light modules for producing light distributions (for example, dipped beam, full beam, daytime running light, etc.), or a vehicle light (e.g. rear light), wherein the motor vehicle headlight or the vehicle light can also include one or more sensors, in particular "optical" sensors, i.e. sensors that operate with wavelengths in the visible range. However, the housing device can also be a "pure" sensor arrangement, in which only one or more sensors, for example optical sensors, are arranged in the housing.

The drainage according to the invention has, inter alia, the following advantages:

it prevents water from getting into the air compressor;

freezing of the air supply line can be prevented;

it can prevent the cover lens from becoming dirty during the cleaning process, which improves the cleaning quality.

The invention claimed is:

1. A cover lens cleaning system comprising:

a transparent cover lens (101) for closing an opening of a housing (102); and a cleaning device (103), wherein the cleaning device (103) has:

an air connection (105), via which air can be supplied to the cleaning device (103), and an air outlet (108), wherein an air duct (107) is formed in the cleaning device (103), which opens into the air outlet (108), wherein the air supplied to the cleaning device (103) flows via the air duct (107) to the air outlet (108), from which it emerges in the form of an air flow, which, in order to clean the transparent cover lens (101), acts on the outer surface of the transparent cover lens (101), wherein the air outlet (108) is arranged in a lower region of the transparent cover lens (101) such that when the transparent cover lens (100) is in an installed position in a motor vehicle the air flow is directed from below onto the outer surface of the transparent cover lens (101), wherein one or more drainage openings (109) leading into an outer space are provided on a lower side (103a) of the cleaning device, via which any moisture or liquid present in the cleaning device (103) can escape, wherein—in the installed position—at least one membrane element (106) is arranged above the one or more drainage openings (109) and is reversibly deformable and is configured such that in a first state, which is an ON state in which the cleaning device (103) is pressurized with air, the at least one membrane element (106) is deformed such that the one or more drainage openings (109) are closed, and in a second state, which is an OFF state in which the cleaning device (103) is not pressurized with air, the at least one membrane element (106) is deformed such that the one or more drainage openings (109) are at least partially not closed.

2. The system according to claim 1, wherein the cleaning device (103) is formed from a body (203), on a lower side (203a) of which an outlet (104) is arranged, in which outlet (104) the one or more drainage openings (109) are arranged.

3. The system according to claim 2, wherein the outlet (104) is designed in the form of an outlet tube (111), which protrudes from the lower side of the body (203), wherein the outlet tube (111) opens into the body (203) of the cleaning device (103), into the air duct (107), and wherein the outlet tube (111) is designed open towards the outer space (300).

4. The system according to claim 3, wherein a support element, which extends over a complete cross-section of the outlet tube (111), is arranged in the outlet tube (111).

5. The system according to claim 4, wherein the one or more drainage openings (109) are arranged in the support element.

6. The system according to claim 4, wherein the at least one membrane element (106) is arranged in the outlet tube (111) and rests on an upper side of the support element, at least partly or completely, depending on the OFF or ON state.

7. The system according to claim 5, wherein the one or more drainage openings are a plurality of drainage openings (109), which are arranged in the support plate (110) in the form of a grid.

8. The system according to claim 1, wherein the air outlet (108) has a slot shape.

9. The system according to claim 1, wherein the air outlet (108) extends over an entire width of the transparent cover lens (101).

10. The system according to claim 1, wherein the at least one membrane element (106) is flat, and in the OFF state is bent.

11. The system according to claim 1, wherein the at least one membrane element (106) is designed to be flat, and in the ON state is substantially flat such that it can rest flat on a support element.

12. The system according to claim 1, wherein the at least one membrane element (106) is made of an elastic material.

13. A housing device (100) for installation in a motor vehicle, wherein the housing device (100) comprises a housing (102), which is designed to receive one or more light modules and/or one or more sensor devices and/or to attach one or more light modules and/or one or more sensor devices to the housing (102), wherein the housing (102) has an opening, and wherein the housing device (100) comprises a cover lens cleaning system according to claim 1, wherein the opening of the housing (102) is closed with the transparent cover lens (101) of the cover lens cleaning system.

14. The housing device according to claim 13, wherein the cleaning device (103) is arranged on the housing (102).

15. The housing device according to claim 13, wherein the one or more light modules and/or the one or more sensor devices are arranged in the housing (102), and/or are attached to the housing (102).

16. The system according to claim 10, wherein the at least one membrane element (106) has an edge, and in the OFF state the at least one membrane element is bent up at its edge.

17. The system according to claim 11, wherein the at least one membrane element (106) in the ON state is substantially flat such that it can rest flat on a support plate (110).

18. The system according to claim 12, wherein the elastic material is silicone or another elastic plastic.

19. The system according to claim 2, wherein the outlet is arranged in a lowest region of the lower side of the body.

20. The system according to claim 4, wherein the support element is a support plate (110) which is arranged in the outlet tube (111) below the body (203).

* * * * *